UNITED STATES PATENT OFFICE.

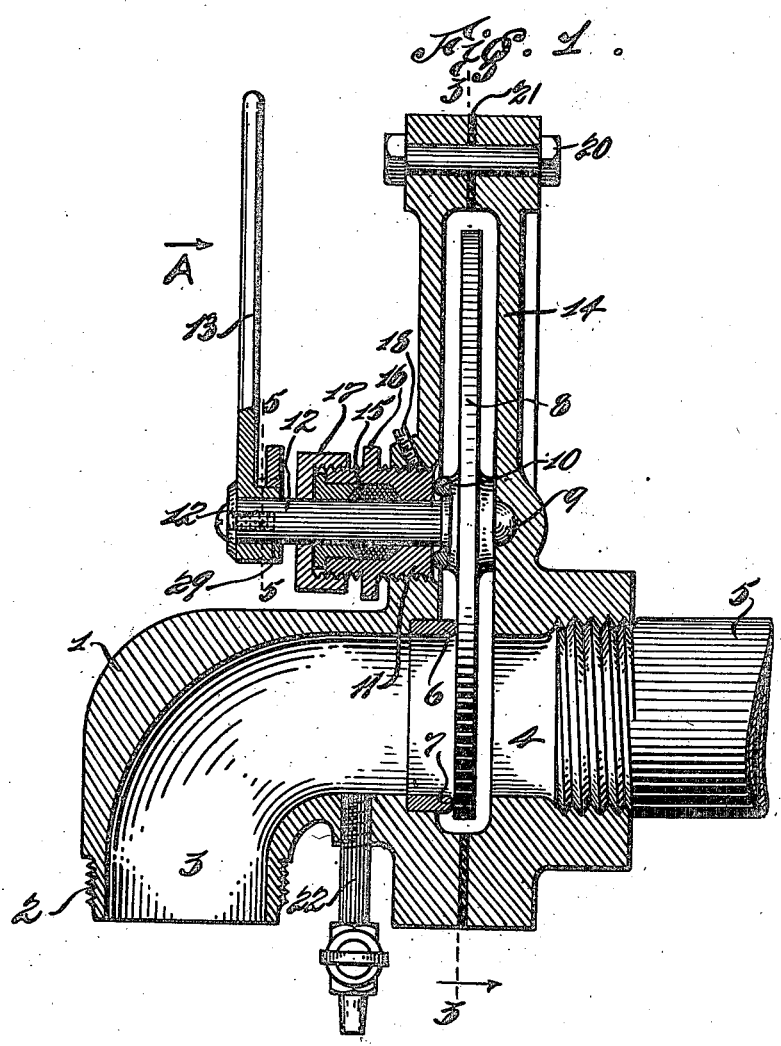

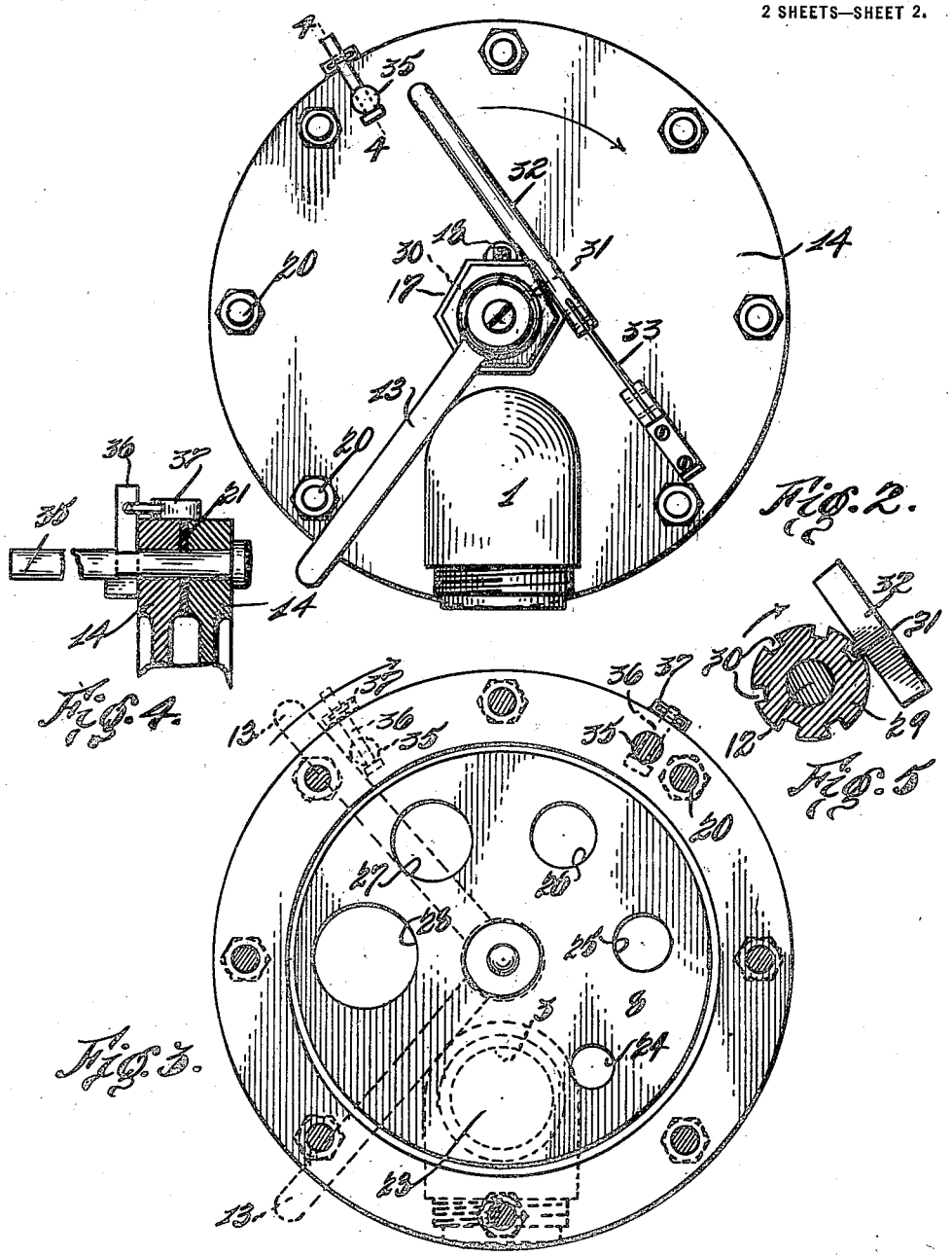

JOHN H. DERBY, OF NEW YORK, N. Y.

PRESSURE-REDUCING VALVE.

1,379,904.  Specification of Letters Patent.  Patented May 31, 1921.

Application filed December 20, 1916. Serial No. 138,097.

*To all whom it may concern:*

Be it known that I, JOHN H. DERBY, a citizen of the United States, residing at New York city, N. Y., have invented certain new and useful Improvements in Pressure-Reducing Valves, of which the following is a clear, full, and exact description.

This invention relates to a pressure reducing valve, and has for its object the provision of a hand-operated valve of this character, which can be easily manipulated against high pressures from a supply line to reduce outlet pressures with both accuracy and certainty.
A further object is to provide means for reducing the pressure at the discharge end of the valve without materially breaking up the body of the stream passing therethrough; in other words, a valve which will discharge a solid round stream in the same manner as if the stream came from a smooth round pipe without obstruction.

Although capable of extensive use, a valve of this character is particularly applicable for use in connection with stand pipe systems for fire hose connections in high buildings. It is usual in these systems to have a water tank at the top of the building of sufficient capacity to supply the ordinary water requirements of the building, and in case of emergency, such as a fire, to supply water for fighting the fire until the city fire apparatus arrives. This water tank has one or more stand pipes running down through the building with fire hose connections usually at each floor and a steamer connection at the street level for connection with the fire engine. It is obvious that in a building many stories high the hose connections of the stand pipe at the lower floors will receive a much greater pressure than the hose connections at the upper floors.

Heretofore serious accidents have occurred when the tenants or janitor force of a building,—inexperienced as they usually are in the handling of a fire hose,—attempt to use the hose connection for one of the lower floors equipped with the ordinary type of valve fixture. The full pressure of the stand pipe at this connection is too great to handle and the ordinary valve provides no certain means for accurately adjusting it to the desired pressure. In an attempt to avoid this danger, the present practice is to install pressure reducing valves at various points in the vertical height of the stand pipe and separate from the hose connections. Such pressure reducing valves often fail to work when called upon, and require frequent testing. The most common method of testing such valves is to try a hose on the street level hose connection, and if not knocked over by the hose, the inspector is left to presume that the pressure reducing valve is in working order.

The present invention therefore aims to supply the requirements of hose connections for such a stand pipe system in a manner to avoid the difficulties heretofore described. Moreover, by having a hand-adjusted pressure reducing means directly at the hose connections, greater accuracy and certainty of operation is attained. Various other advantages will also become apparent from the more detailed description which follows upon inspection of the drawings, and the scope of the invention will be more particularly pointed out in the appended claims.

In said drawings, which show the preferred embodiment of my invention,

Figure 1 is a vertical section of a valve fixture embodying the invention, with the valve handle up;

Fig. 2 is a front elevation of the same looking in the direction of arrow A, Fig. 1, with the valve handle down;

Fig. 3 is a section along line 3—3 of Fig. 1, looking in the direction of the arrow and showing the handle in dotted lines in two positions;

Fig. 4 is a detail section of the valve disk casing showing the preliminary stop; and Fig. 5 is a detail section through line 5—5 of Fig. 1, showing the spring catch for holding the handle in adjusted positions.

Referring to the drawings in detail, and particularly Fig. 1, the body of the valve fixture is indicated at 1 with a suitable hose connection 2 at the outlet opening 3, and at the inlet 4 of the fixture is a pipe 5 leading from the main line, in this instance presumed to be the stand pipe of a water supply system in a high building. At the inner end of the outlet passageway 3 is arranged the valve seat 6 for said outlet, which preferably consists of a bronze ring presenting a smooth rounded edge 7 to the valve disk 8, which seats upon said seat for closing the outlet.

The valve disk 8, shown more clearly in Fig. 3, is pivotally mounted at one side of the outlet 3, so that a segmental portion of said valve disk is arranged to cover and seat upon the valve seat 6. One side of said valve disk is preferably provided with a semi-spherical pivot boss 9 and the other side of said valve disk has a circular bearing ring 10 with rounded edges for turning engagement against packing bushing 11. I prefer to form the bearing boss 9, bearing ring 10 and packing bushing 11 of bronze to thus provide a non-frictional bearing for said disk 8. Extending from one side of the valve disk 8 is the operating stem 12 fixed at its outer end to an operating handle 13. The valve disk 8, as shown, is entirely inclosed except for the portion resting upon the valve seat 6, within the fluid tight casing 14, and the operating stem 12, as it extends through said casing 14, is provided with fluid tight packing, consisting of the bushing 11, packing 15, gland 16 and nut 17.

The packing bushing 11 is screw-threaded within the casing 14 so as to be screwed down firmly against the bearing ring 10 of the disk 8, and in order to hold it tightly in this set position, I have provided a set screw 18. This construction enables me to properly aline the pivotal bearing of said disk 8 against any tendency to distortion, due to the difference of pressures at the segmental portion lying across the valve seat 6. The casing 14 is preferably made in two parts as shown, held together by bolts 20 with a packed joint 21 for ease in disassembling the fixture. A drip pipe 22 may also be provided for the outlet passage 3.

The valve disk 8, as shown in Fig. 3, has a solid segmental portion 23 adapted to lie across the valve seat 6 and thereby close the outlet 3, and disposed around the segmental portion of said disk 8 is a series of openings 24, 25, 26, 27, preferably round, with their centers on a circle concentric with the disk. These openings are of gradually increasing size so that when successively brought to register with the outlet 3 they will allow more or less fluid to flow through said outlet. It will be noted, however, that these disk openings, although smaller in size than the outlet 3 to thereby restrict the pressure at the hose connection 2, are round so that the restriction of the opening at 3 is by a concentric reduction in size of said opening. These round openings do not break up the stream coming through said outlet, whereby the body of fluid will come through the hose connection in round solid form for greater carrying force. It will be obvious that the various openings in the disk 8 may be brought to successively register with the outlet 3 by turning the valve disk in the direction of the arrow, Fig. 2.

Preferably fixed upon the operating stem 12 of the disk is a notched wheel 29, see Fig. 5, into the notches 30 of which tooth 31 of catch bar 32 is adapted to engage. The catch bar 32 is fixed to the outside of the casing 14 through spring 33 so as to have a yielding bearing upon said notched wheel 29. It is understood that the notches 30 are so spaced with respect to the openings 24 to 28 inclusive, that the catch bar 32 will engage and stop the wheel 29 at various fixed adjustable positions, namely, positions to register various disk openings with the outlet 3.

The movement of the disk for valve closing position is limited, as shown in Fig. 2, by the engagement of the handle 13 with the body 1 of the fixture. It is also sometimes desirable, particularly in a building where inexperienced tenants are liable to handle the valve, to limit the valve's opening capacity, at least until the more experienced firemen arrive on the scene. For this purpose I have provided a lockable limiting stop consisting of a metal post 35 adapted to project from the casing 14 far enough to be engaged and stop the swinging of handle 13. Said post, however, is arranged to be slid into an inoperative position and is normally maintained in stopping position by a locking device consisting of a latch 35 and an ordinary pad-lock 37, see Fig. 4. It is understood that the firemen, or other persons authorized to release the device, will be provided with a key to the lock 37, so that by opening said pad-lock the latch 36 can be withdrawn from the posts 35 and the said posts 35 slid backwardly out of the path of the handle 13, thereby releasing the valve for a more extended position; in other words, to enable the disk 8 to be adjusted to bring larger openings in register with the outlet 3.

The field of usefulness for my pressure reducing valve fixture will now become apparent from the foregoing description. The device is to a large extent fool-proof and yet the full service of the line is available to authorized and experienced handlers. For instance, at the start of a fire, a tenant may operate this valve fixture and get pressure from the main supply line up to a limited degree and not enough to endanger life and limb. Then, when more valves are turned on at the other floors of the building, the first valve may be opened wider for greater pressure by the authorized person having the key to the stop lock.

It is obvious that various changes and modifications may be made in the details of the construction herein shown and described, without departing from the spirit and scope of the invention as hereinafter claimed, and I therefore do not wish to have my claims interpreted narrowly to cover only the arrangement shown, but to be interpreted broadly enough to cover obvious changes and equivalent structures.

What I claim as new is:—

1. In a pressure reducing valve for use with high pressure supply lines, the combination with a pressure reducing valve fixture having an inlet and an outlet and a narrow edge valve seat between said inlet and said outlet, of a valve member movable across said seat and across the direct line of flow between said inlet and said outlet and coöperating with said seat both to close said outlet and to provide graduated discharge openings, said valve member being entirely inclosed within said fixture, being constantly held against said seat by the fluid pressure and having its two sides freely exposed to inlet pressure except at said seat.

2. In a pressure reducing valve for use with high pressure supply lines, the combination with a pressure reducing valve fixture having an inlet and an outlet and a narrow edge valve seat between said inlet and said outlet, of a valve disk rotatable across said seat and across the direct line of flow between said inlet and said outlet about an axis at one side thereof and coöperating with said seat both to close said outlet and to provide graduated discharge openings, said valve seat presenting a narrow edge to said disk against which said disk is constantly held by fluid pressure, and said disk being entirely closed within said fixture and having both sides freely exposed to inlet pressure except at said seat.

3. In a pressure reducing valve for use with high pressure supply lines, the combination with a pressure reducing valve fixture having an inlet and an outlet and a narrow edge valve seat between said inlet and said outlet, of a valve member movable across said seat in a direction normal to the direction of flow between said inlet and said outlet, and coöperating with said seat both to close said outlet and to provide graduated discharge openings, said valve member being entirely inclosed within said fixture, being at all times held against said seat by the fluid pressure and having its two sides freely exposed to inlet pressure except at said seat.

4. The combination with a pressure reducing valve fixture having an inlet and an outlet and a valve seat between said inlet and said outlet, of a valve disk normal to the direction of flow between said inlet and said outlet, rotatable across said seat about an axis at one side thereof and coöperating with said seat both to close said outlet and to provide graduated discharge openings, said valve seat presenting a narrow edge to said disk against which said disk is constantly held by fluid pressure, and said disk being entirely inclosed within said fixture and having both sides exposed to inlet pressure except at said seat.

5. The combination with a pressure reducing valve fixture having an inlet for receiving fluid under pressure and an outlet for discharging fluid under reduced pressure, and a valve seat for said outlet, of a valve member movable transversely of said outlet and having successive restricting portions for opening said outlet arranged to seat upon said valve seat, a casing inclosing the unseated portions of said valve member and communicating with said inlet so that all portions of said valve member except the portion seated upon said inlet are balanced by said inlet pressure, an operating stem for adjusting said valve member extending through said casing, a catch device for holding said operating stem in its different adjusted positions, and a lockable device for limiting the opening adjustments of said handle and unlockable for permitting a further opening of said valve.

6. The combination with a pressure reducing valve fixture having an inlet for receiving fluid under pressure and an outlet for discharging fluid under reduced pressure, and a valve seat for said outlet, of a valve member movable transversely of said outlet and having successive restricting portions for opening said outlet arranged to seat upon said valve seat, and a lockable device arranged to limit the opening adjustments of said valve member and releasable when unlocked for permitting a further opening of said valve.

7. The combination with a fluid pressure reducing valve fixture, having an inlet and an outlet and a valve seat between said inlet and said outlet, of a valve member movable across the seat and normally held seated by the fluid pressure, said valve coöperating with said seat both to close said outlet and to provide graduated discharge openings in its different positions of adjustment across said seat, and a lockable device arranged to limit the opening movement of said valve member when locked and to permit a further opening movement when unlocked.

8. The combination with a fluid pressure reducing valve fixture having an inlet and an outlet and a valve seat between said inlet and said outlet, of a valve disk wholly inclosed within said fixture, rotatable across said seat about an axis at one side thereof and constantly held seated by the fluid pressure, means projecting outside said fixture for effecting the movement of said valve across said seat, said valve coöperating with said seat both to close said outlet and to provide graduated discharge openings in its different positions of adjustment across said seat and having its two sides freely exposed to inlet pressure except at said seat, and an anti-friction thrust bearing concentric with the axis of said disk arranged to receive the valve seating pressure at said axis.

9. The combination with a pressure reducing valve fixture having an inlet for receiving fluid under pressure and an outlet for discharging fluid under reduced pressure, and a narrow edge valve seat for said outlet, of a valve disk pivoted at one side of said valve seat and having restricting segmental portions for successively seating upon said valve seat to open said outlet, a spaced casing for inclosing the unseated portions of said valve disk, said casing having communication with said inlet.

10. The combination with a pressure reducing valve fixture having an inlet for receiving fluid under pressure and an outlet for discharging fluid under reduced pressure, and a narrow edge valve seat for said outlet, of a valve disk pivoted at one side of said valve seat and having restricting segmental portions for successively seating upon said valve seat to open said outlet, a spaced casing for inclosing the unseated portions of said valve disk, said casing having communication with said inlet, an operating stem for said valve disk extending through said casing, a handle for said stem and a spring-operated catch device for holding said stem in adjusted position.

11. The combination with a pressure reducing valve fixture having an inlet for receiving fluid under pressure and an outlet for discharging fluid under reduced pressure, and a narrow edge valve seat for said outlet, of a valve disk pivoted at one side of said valve seat and having segmental portions with different size round openings therein for successively seating upon said valve seat, a spaced casing for inclosing the unseated portions of said valve disk, said casing having communication with said inlet, an operating stem extending through said casing and secured to said disk at the pivot thereof, a notched wheel on said stem and a spring impelled catch for engaging said notched wheel for holding said stem in different adjusted positions.

Signed at New York city, N. Y., this 18" day of December, 1916.

JOHN H. DERBY.

Witnesses:
   BEATRICE MIRVIS,
   FLORENCE JACKSON.